VOICE FREQUENCY SIGNALLING SYSTEM

Filed March 7, 1962

INVENTOR
GEORG VOGEL
BY Paul W. Henninger
ATTORNEY

United States Patent Office 3,187,109
Patented June 1, 1965

3,187,109

VOICE FREQUENCY SIGNALLING SYSTEM

Georg Vogel, Auenweg, Germany, assignor to International Standard Electric Corporation, New York, N.Y., a corporation of Delaware Filed Mar. 7, 1962, Ser. No. 178,122
Claims priority, application Germany, Mar. 25, 1961, St 17,623
7 Claims. (Cl. 179—84)

This invention relates in general to voice frequency signalling systems and in particular to speech immunity arrangements therein. Its principal object is to provide a new and improved system of the above character in which false digit recordations from voice signals are prevented by a simple yet reliable arrangement.

With the advent of voice frequency signalling for transmitting digit signals indicative of the telephone number, numerous arrangements have been proposed for preventing voice signals at the calling telephone from being recorded as digit signals. These known arrangements include (1) the simultaneous transmission of a combination of two different frequencies, (2) the simultaneous transmission of a combination of a digit-indicating voice-frequency signal and a guard frequency signal which lies outside the speech band, and (3) the transmission of a potential of a predetermined amplitude or polarity together with the digit-indicating signal.

In each of the above known voice signalling systems, special control contacts or keys are required at each subset to cause the transmission of these special signals which guard against speech interference. The maintenance and initial investment for equipment at the subset is quite costly as compared to signalling systems wherein the equipment at the subset is maintained at a minimum.

Another known method using a minimum of equipment at each subset is based on effecting digit signal transmission during the time the handset is at rest and effecting speech transmission when the handset is removed from the subset. While economies are present in this system, it is accompanied by the disadvantage that the subscriber cannot hear busy tone signals or other announcements during the selecting operation.

According to the present invention speech immunity in voice frequency dialing arrangements is accomplished with a single frequency without the addition of special equipment at the subset. This is accomplished by arranging the digit register in the exchange, in response to seizure thereof, to periodically reverse the current direction over the calling line at a repetition rate in excess of the maximum keying speed until a selecting signal is received. At that time, the signal receiver and current direction is maintained constant until the end of the digit signal and then the line current direction is periodically reversed until the next signal is received. In this way, the microphone is effectively shunted while the register equipment is in a receiving condition.

Further, the present invention is concerned with an arrangement wherein the register transmits a fixed frequency signal during each half period the current direction indicates a signalling time. Special equipment in the register can then evaluate whether the subset is transmitting digit signals. These special circuits include frequency generators which are only effective during the noted hold period when the current direction is the signalling direction. Also, a special rectifier circuit is associated with the subset transmitter which effectively connects it to the line during proper intervals.

The noted rectifier circuit includes a condenser to insure that all audible signals can pass to the receiver during the selecting period.

Features of the invention relate to arrangements for disconnecting the registering apparatus after a predetermined time interval and in using the noted generators for ringing current generation.

Other objects and features of the invention will become apparent and the invention will be best understood when the specification is read in conjunction with the accompanying drawings comprising FIGS. 1 to 3 in which.

Figures 1, 2:
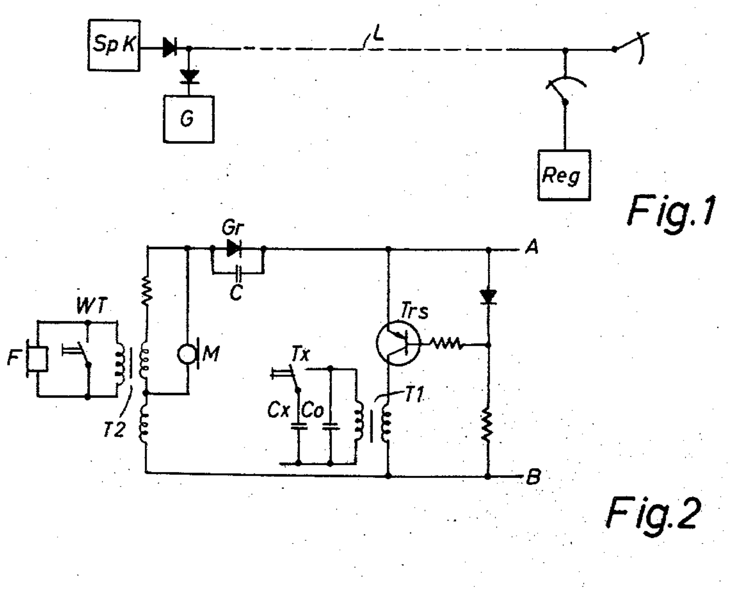
FIG. 1 shows a simplified block diagram of a calling subset set and central office registering apparatus.
FIG. 2 shows a simplified circuit diagram of the subset.

Referring now to FIG. 1 of the drawings, a speaking circuit S*p*K and a digit selecting circuit G are shown connected to line L by oppositely poled rectifiers. A register R*eg* is associated with the exchange end of line L and controls the direction of current over the line to effectively connect the speaking circuit S*p*K or signalling circuit G to line L depending upon the polarity of the current.

FIG. 2 shows a more complete circuit diagram of the subset of the invention. The speaking circuit which includes microphone M is effectively coupled to line conductor A by rectifier G*r* when the voltage on line conductor B is more positive than the voltage on conductor A. Thus during the speech period, rectifier G*r* is conducting and the voice frequency signals from the transmitter are transmitted to the register at the central office. The signalling circuit G of FIG. 1 is shown in greater detail in FIG. 2 and comprises a PNP type transistor T*rs* and associated circuitry. When the current direction on line L is such that rectifier G*r* is conducting, the transistor T*rs* is non-conducting. In the reverse current direction, transistor T*rs* conducts and in conjunction with transformer T1 and associated condensers C*x* and C*o* which are selectively connected by a pushbutton key T*x*, generate a single frequency which is indicative of the digit dialed.

The receiving circuit of the subset includes transformer T2 hookswitch WT and receiver F. A condenser C is bridged across rectifier G*r* to permit all voice frequency signals, such as busy tone, to reach receiver F when the current direction is for digit signalling.

Figure 3:
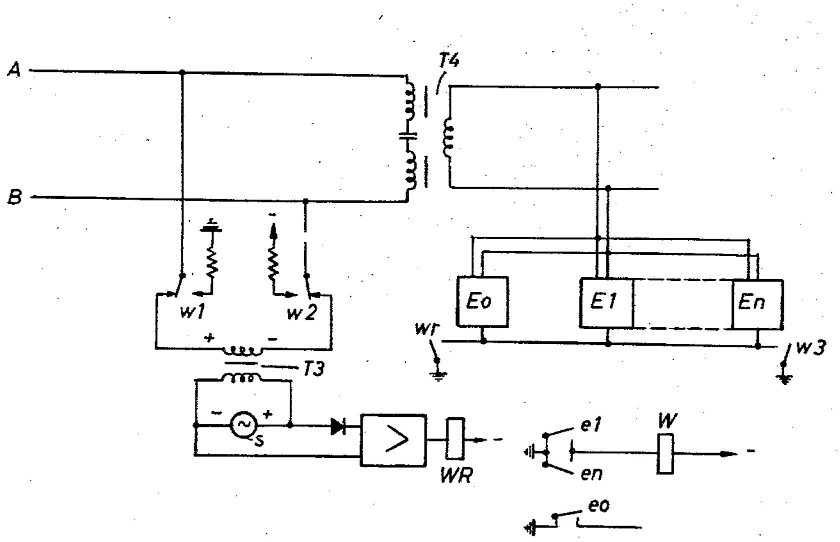
FIG. 3 shows a simplified circuit diagram of the registering apparatus in the central office.

FIG. 3 shows in some circuit detail, the digit receiving portion of the register R*eg* of FIG. 1.

Immediately upon seizure of register R*eg* by a calling line condition, an alternating current voltage from source S is applied to the calling line through transformer T3. The frequency of this voltage is in excess of the maximum keying speed so that the shortest keying pulse is reliably received. Thus, the current direction over the calling line is periodically reversed and the speaking circuit and selecting circuits are alternately energized. As long as pushbutton key T*x* of FIG. 2 is not operated, the basic frequency of the signal generator is periodically transmitted back to the register.

Register R*eg* includes a frequency receiver E*o* which detects through transformer T4 the basic frequency in order to evaluate when a digit signal is transmitted.

When one of the numerous pushbuttons T*x* is operated, a different frequency is generated and the corresponding one of the digit receivers E1 to E*n* will be energized. Contacts *e*1, *en* and *eo* are operated when the respectively corresponding receivers *E*1, *En* and *Eo* detect their respective frequencies.

Contacts *e*1 to *en* operate a selecting relay W which through its contacts *w*1 and *w*2 applies a steady current of the selecting polarity to the line until the operated pushbutton is released, the associated receiver is de-energized and relay W releases.

The register R*eg* includes a supervisory relay WR which is energized on half cycles by the alternating current source S and associated rectifier D1. Contacts W*r* thereon control the energization of the signal receivers during the selecting current direction interval only. If relay W is energized from one of the receivers detecting a digit signal, contacts W3 will pre-empt contacts W*r* and maintain the receiver energized until the end of the digit pulse.

While the principles of the invention have been described above in connection with specific apparatus and applications, it is to be understood that this description is made only by way of example and not as a limitation on the scope of the invention.

What is claimed is:

1. A voice frequency signalling arrangement for use in transmitting data and speech signals from a remote station to central equipment over an interconnecting transmission line, data recording means in said central equipment, means responsive to a calling condition at said station for interconnecting said data recording means and said station over said transmission line, current supply means in the said central equipment responsive to said interconnection for supplying said station with alternating control current, a speech circuit and a data signalling circuit in said station and means for alternately energizing said circuits on successive half cycles of said alternating current, and current switching means responsive to the operation of said energized data signalling circuit for controlling said current supply means to substitute current of a constant polarity for the said alternating current.

2. A voice frequency signalling arrangement as set forth in claim 1 wherein said data signalling circuit includes means for generating a first frequency when said data signalling circuit is energized and for generating a different frequency when said data signalling circuit is operated, and frequency detecting means in said data recording means for detecting the operative condition of said data signalling circuit.

3. A voice frequency signalling arrangement for use in transmitting data and speech signals from a remote station to central equipment over an interconnecting transmission line, data recording means in said central equipment, means responsive to a calling condition at said station for interconnecting said data recording means and said station over said transmission line, current supply means in the said central equipment responsive to said interconnection for supplying said station with alternating control current, a speech circuit and a data signalling circuit in said station and means for alternately energizing said circuits on successive half cycles of said alternating current, current switching means responsive to the operation of said energized data signalling circuit for controlling said current supply means to substitute current of a constant polarity for the said alternating current, and wherein the said data recording means includes means responsive to the release of said data signalling circuit for controlling said current supply means to substitute said alternating current for said current of a constant polarity.

4. A voice frequency signalling arrangement for use in transmitting data and speech signals from a remote station to central equipment over an interconnecting transmission line, data recording means in said central equipment, means responsive to a calling condition at said station for interconnecting said data recording means and said station over said transmission line, current supply means in the said central equipment responsive to said interconnection for supplying said station with alternating control current, a speech circuit and a data signalling circuit in said station and means for alternately energizing said circuits on successive half cycles of said alternating current, current switching means responsive to the operation of said energized data signalling circuit for controlling said current supply means to substitute current of a constant polarity for the said alternating current, said data signalling circuit includes means for generating a first frequency when said data signalling circuit is energized and for generating a different frequency when said data signalling circuit is operated, frequency detecting means in said data recording means for detecting the operative condition of said data signalling circuit and wherein the said means for detecting the operative condition of said data signalling circuit includes means for operating the said current switching means.

5. A voice frequency signalling arrangement for use in transmitting data and speech signals from a remote station to central equipment over an interconnecting transmission line, data recording means in said central equipment, means responsive to a calling condition at said station for interconnecting said data recording means and said station over said transmission line, current supply means in the said central equipment responsive to said interconnection for supplying said station with alternating control current, a speech circuit and a data signalling circuit in said station and means for alternately energizing said circuits on successive half cycles of said alternating current, current switching means responsive to the operation of said energized data signalling circuit for controlling said current supply means to substitute current of a constant polarity for the said alternating current, said data signalling circuit includes means for generating a first frequency when said data signalling circuit is energized and for generating a different frequency when said data signalling circuit is operated, frequency detecting means in said data recording means for detecting the operative condition of said data signalling circuit, wherein the said data signalling means includes a plurality of separately operable selecting means for controlling the said generator means to generate a plurality of respectively corresponding frequencies each different than the said first frequency, a plurality of respectively corresponding frequency detector means in said data recording means for receiving said generated frequencies and means in each of said detector means responsive to the receipt of a corresponding frequency for controlling the said current switch means.

6. A voice frequency signalling arrangement for use in transmitting data and speech signals from a remote station to central equipment over an interconnecting transmission line, data recording means in said central equipment, means responsive to a calling condition at said station for interconnecting said data recording means and said station over said transmission line, current supply means in the said central equipment responsive to said interconnection for supplying said station with alternating control current, a speech circuit and a data signalling circuit in said station and means for alternately energizing said circuits on successive half cycles of said alternating current, current switching means responsive to the operation of said energized data signalling circuit for controlling said current supply means to substitute current of a constant polarity for the said alternating current, said data signalling circuit includes means for generating a first frequency when said data signalling circuit is energized and for generating a different frequency when said data signalling circuit is operated, frequency detecting means in said data recording means for detecting the operative condition of said data signalling circuit, wherein said data recording means includes supervisory means synchronized with said alternating current and wherein said supervisory means includes means for energizing said detecting means during the half cycles said data signalling circuit is energized.

7. A voice frequency signalling arrangement for use in transmitting data and speech signals from a remote station to central equipment over an interconnecting transmission line, data recording means in said central equipment, means responsive to a calling condition at said station for interconnecting said data recording means and said station over said transmission line, current supply means in the said central equipment responsive to said interconnection for supplying said station with alternating control current, a speech circuit and a data signalling circuit in said station and means for alternately energizing said circuits on successive half cycles of said alternating current, current switching means responsive to the operation of said energized data signalling circuit for controlling said current supply means to substitute current of a constant polarity for the said alternating current, said data signalling circuit includes means for generating a first frequency when said data signalling circuit is energized and cuit in said station and means for alternately energizing for generating a different frequency when said data signalling circuit is operated, frequency detecting means in said data recording means for detecting the operative condition of said data signalling circuit, wherein said frequency detecting means includes first frequency detector means for detecting the said first frequency and wherein said first frequency detecting means includes means for disconnecting said data recording means from said station responsive to the continued detection of said first frequency for a predetermined time interval.

References Cited by the Examiner

UNITED STATES PATENTS

| | | | |
|---|---|---|---|
| 2,542,592 | 2/51 | Styren | 179—84 |
| 2,554,201 | 5/51 | Lundkvist | 179—90 |
| 2,672,523 | 3/54 | Dunlap et al. | 179—81 |
| 2,701,279 | 2/55 | Lovell et al. | 179—90 |
| 2,717,280 | 9/55 | Lovell | 179—90 |
| 3,011,028 | 11/61 | Boswau | 179—90 |

FOREIGN PATENTS

| | | |
|---|---|---|
| 845,375 | 11/60 | Great Britain. |

ROBERT H. ROSE, *Primary Examiner.*